(12) United States Patent
Moitra et al.

(10) Patent No.: US 8,219,583 B2
(45) Date of Patent: Jul. 10, 2012

(54) METHODS AND SYSTEMS FOR MINING WEBSITES

(75) Inventors: Abha Moitra, Scotia, NY (US); Steven Matt Gustafson, Niskayuna, NY (US); Feng Xue, Clifton Park, NY (US)

(73) Assignee: NBCUniversal Media, LLC, Wilmington, DE (US)

( * ) Notice: Subject to any disclaimer, the term of this patent is extended or adjusted under 35 U.S.C. 154(b) by 787 days.

(21) Appl. No.: 12/267,778

(22) Filed: Nov. 10, 2008

(65) Prior Publication Data

US 2010/0121850 A1 May 13, 2010

(51) Int. Cl.
*G06F 17/30* (2006.01)
(52) U.S. Cl. ........................................ 707/776; 707/711
(58) Field of Classification Search .................... None
See application file for complete search history.

(56) References Cited

U.S. PATENT DOCUMENTS

| | | | |
|---|---|---|---|
| 5,848,396 A | 12/1998 | Gerace | |
| 6,144,962 A | 11/2000 | Weinberg et al. | |
| 6,385,619 B1 | 5/2002 | Eichstaedt et al. | |
| 6,567,797 B1 | 5/2003 | Schuetze et al. | |
| 6,701,362 B1 | 3/2004 | Subramonian et al. | |
| 6,816,848 B1 * | 11/2004 | Hildreth et al. | 706/45 |
| 6,934,748 B1 | 8/2005 | Louviere et al. | |
| 7,085,682 B1 | 8/2006 | Heller et al. | |
| 7,146,416 B1 | 12/2006 | Yoo et al. | |
| 7,162,522 B2 | 1/2007 | Adar et al. | |
| 7,165,105 B2 | 1/2007 | Reiner et al. | |
| 2003/0110255 A1 | 6/2003 | Tarquini et al. | |
| 2004/0073644 A1 | 4/2004 | Koch et al. | |
| 2006/0271671 A1 | 11/2006 | Hansen | |
| 2008/0086558 A1 | 4/2008 | Bahadori et al. | |
| 2008/0281817 A1 * | 11/2008 | White et al. | 707/6 |

FOREIGN PATENT DOCUMENTS

| | | |
|---|---|---|
| EP | 1758026 A1 | 2/2007 |
| EP | 1918832 A2 | 5/2008 |

OTHER PUBLICATIONS

Heer et al. Mining the Structure of User Activity using Cluster Stability, in Proceedings of the Workshop on Web Analytics, SIAM Conference on Data Mining, Mar. 2002, Arlington VA.*
Olfa Nasraoui, Hichem Frigui, Anupam Joshi, Raghu Krishnapuram; "Mining Web Access Logs Using Relational Competitive Fuzzy Clustering"; In Proceedings of the Eight International Fuzzy Systems Association World Congress 1999; Downloaded from Internet:<http://lime.cs.uga.edu/storm/pdf/IFSA88.pdf>; 6 Pages.
Ajith Abraham; "iMiner: A Web Usage Mining Framework Using Hierarchical Intelligent Systems"; The IEEE International Conference on Fuzzy Systems 2003; pp. 1129-1134.

(Continued)

*Primary Examiner* — Jean B Fleurantin
*Assistant Examiner* — Anteneh Girma
(74) *Attorney, Agent, or Firm* — Fletcher Yoder (57) ABSTRACT

Mining of websites that in one embodiment includes obtaining web usage data of user sessions of a website, wherein the website has a hierarchical structure with granular levels and has mapping from each webpage of the website into the hierarchical structure, mapping the user sessions to the hierarchical structure of the website resulting in hierarchical user sessions, initiating an edit distance metrics to determine similarity in the hierarchical user sessions, and clustering similar hierarchical user sessions into groups.

23 Claims, 5 Drawing Sheets

OTHER PUBLICATIONS

Halvey, M., Keane, M.T. & Smyth, B.; "Time-Based Segmentation of Log Data for User Navigation Prediction in Personalization"; Web Intelligence, 2005. Proceedings. The 2005 IEEE/WIC/ACM International Conference; pp. 636-640.

Nasraoui et al.; "A Web Usage Mining Framework for Mining Evolving User Profiles in Dynamic Web Sites"; IEEE Transactions on Knowledge and Data Engineering, vol. 20, No. 2, Feb. 2008; pp. 202-215.

* cited by examiner

METHODS AND SYSTEMS FOR MINING WEBSITES

BACKGROUND

Web usage mining refers to the application of data mining techniques to automatically discover user access patterns from web usage data. Web usage mining typically involves tracking browsing activities using a variety of measures such as individual mouse clicks and time spent on a portion of a webpage in order to have a user's browsing footprint available at the web server. Generally, website mining results include features such as number of page views, number of unique users, browser and operating system information, users website view pattern, widely viewed pages, browser and operating system information.

Website usage mining is useful to track the website usage information in order to track the impact of website and enhance business opportunities. Tracking usage patterns can be useful for identifying which content on the website is being heavily used (and therefore should be kept) and which content is not being heavily used (and may be a candidate for archiving). In addition it helps to improve the website designing by rearranging the content on the pages so that the end users have a more convenient experience while exploring the website. In addition site usage statistics can also keep track of how much storage space the websites are taking, which content on the website is important, and the level of activity for particular websites.

Conventional web usage analysis or web mining typically focus on number of page views for individual pages on a website which does not provide the context of the page views nor how users navigate through the website. Conventional methods also determine individual user sessions however due to large number of distinct user sessions it is difficult to capture, analyze and summarize the user behavior. Thus, the sequence of page views or pattern of website surfing in one or more user sessions or the relationship between users sessions cannot be established, which is useful to analyze and identify the most important data on websites.

BRIEF DESCRIPTION

In accordance with one exemplary embodiment of the present invention, a method for mining websites is disclosed. The method includes obtaining web usage data of user sessions of a website, wherein said website has a hierarchical structure with granular levels and has mapping from each webpage of the website to the hierarchical structure; mapping the user sessions to the hierarchical structure of the website resulting in hierarchical user sessions; initiating metrics to determine similarity in the hierarchical user sessions; and clustering similar hierarchical user sessions into groups. The method further includes visualizing clusters and detecting trends or anomalies.

In accordance with another exemplary embodiment of the invention a method for segmenting website users is disclosed. The method includes obtaining web usage data of said users of a website, wherein said website has a hierarchical structure with granular levels and has mapping from each webpage of the website to the hierarchical structure; characterizing said users to determine user vectors of the users; clustering said users into groups based upon similarity in user interest; determining centroids of the groups using the user vectors of each of the groups wherein the centroid represents interest vectors of the groups; and determining closeness between the groups or atleast one user and atleast one group.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The invention relates generally to website mining and more particularly to systems and methods of website data mining to determine user behavior patterns across site hierarchies from web usage data. As discussed in detail below, embodiments of the system typically include arrangement of website user sessions, wherein the website usage data includes information of user sessions on the website. The user sessions are mapped to the hierarchy of the website resulting in hierarchical user sessions. Similarity between the hierarchical user sessions is determined using a metric, which determines similarity between the hierarchical user sessions. Based on similarity between the hierarchical user sessions, similar user sessions are clustered in a group or cluster. The processing can include visualization and analysis for detecting trends of interest.

Figure 1:
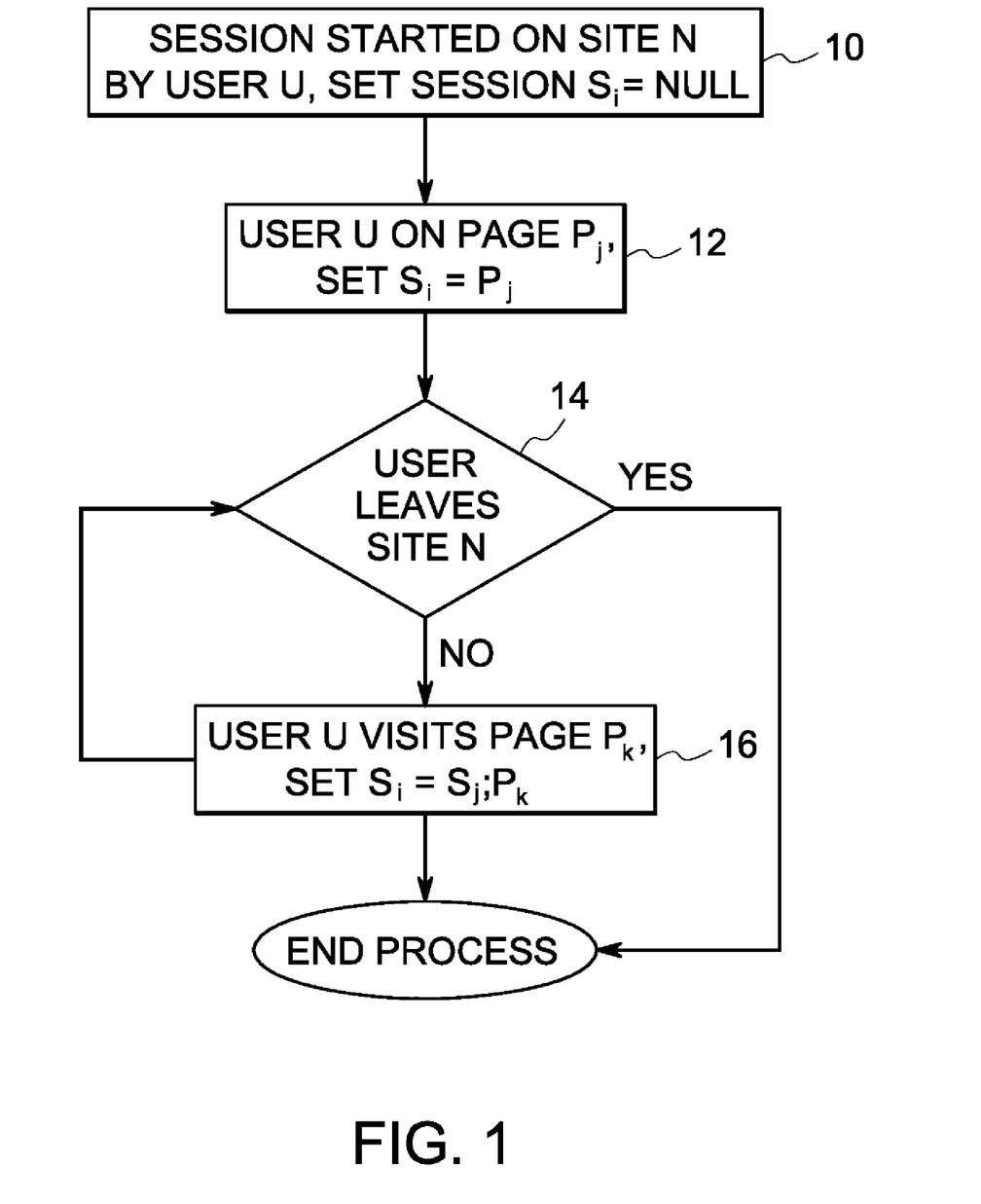
FIG. 1 illustrates a flow chart for arranging data of a user session.

FIG. 1 illustrates a flow chart for arranging the user session data according to an embodiment of the invention. A website includes hierarchical distribution of content of the website such that each content on a page of the website is categorized in at least two levels of hierarchy. Thus, the website has a finite number of levels with mapping from each website page into the level hierarchy. In the website, each website page or webpage is numbered and has a granular level in the hierarchical structure. A user session is typically a sequence of a number of website page views. In one embodiment, independent user sessions in different logins by the same user may be considered as different user sessions. Alternatively, in another embodiment, independent user sessions in different logins by the same user may be considered as a single user session. In one embodiment the user sessions or users that hold importance in favor of some business interest or business preference may be considered for arrangement. For example, when business interest or business preference is in users visiting website pages having information related to computers, then users or user sessions that visit such website pages will be considered for arrangement. Thus, a user session and a hierarchical user session respectively can be represented as:

$$S=<P1, P2> \text{ or } S=P1;P2 \text{ where } P1, P2 \text{ are pages, and}$$
$$HS=<level_{1,1}, level_{2,1}>; <level_{1,2}, level_{2,2}>$$

where P1 is mapped to $<level_{1,1}, level_{2,1}>$ and P2 is mapped to $<level_{1,2}, level_{2,2}>$ Referring now to step 10 of FIG. 1, a new session $S_i$ of a user U on a website is initialized as null where i is the number of session. For example, when a first session is started on a website N, the value of i is 1 thus $S_1$=null. The website session is kept null until the user U visits a website page, thus the null session signifies no website page surfing by a user U on the website N. When a user surfs a website page of the website N, the session length equals the number of website pages that are visited by the user. In step 12 session $S_i$ is appended to include the page number visited in a user session and is represented as $S_i=P_j$. In one embodiment if the website pages visited are $P_1$, $P_2, P_3 \ldots P_j$ then in step 12, $S_i=<P_1, P_2, P_3 \ldots P_j>$ where j is equal to the number of website pages visited. For example, if in session 1 a user visits page 1 of the website N, then $S_1=P_1$. If the user U leaves the website in a session, the process is ended in step 14 for that user session, otherwise in step 16 the user session $S_i$ is set to $S_i=S_i;P_k$ where k is the number of page visited by the user, and $P_k$ is the last website page visited by the user. In one aspect, a user session of the user U may look as follows:

$$S_1=<P_1, P_4, P_5, P_6>$$

The process of appending the pages in the session continues until the user session is ended. The processing 10, 12, 14, 16 continues for all selected user sessions of the website for a particular period of time. The time period selected may vary as per business interest. In one illustrative example, if there are five sessions for five same or different users and they have surfed different pages than the sessions can look as follows:

$$S_1=<P_1, P_2>, S2=<P_2, P_5>, S_3=<P_4, P_8, P_9>, S4=>P_5, P_6, P_9>, S_5=<P_3, P_4, P_7>$$

The user sessions data used for arranging the data in FIG. 1 can be collected for example by logfile analysis on a web server or page tagging techniques. Web servers record all their transactions in a log file, and these log files can be read to provide data about the user sessions. Two units including page views and user sessions are used to gauge the amount of activity on web servers. A page view may be defined as a request made to the web server for a page, as opposed to a graphic, while a user session may be defined as a sequence of requests from a uniquely identified client that expires after a certain amount of inactivity. In page tagging, images are included in a web page, and the number of times that image is requested from that or another web server represents an estimate of the number of visits to that page. Page tagging also includes sending web server requests to a web server to notify that server of the current page being visited on the web site.

Figure 2:
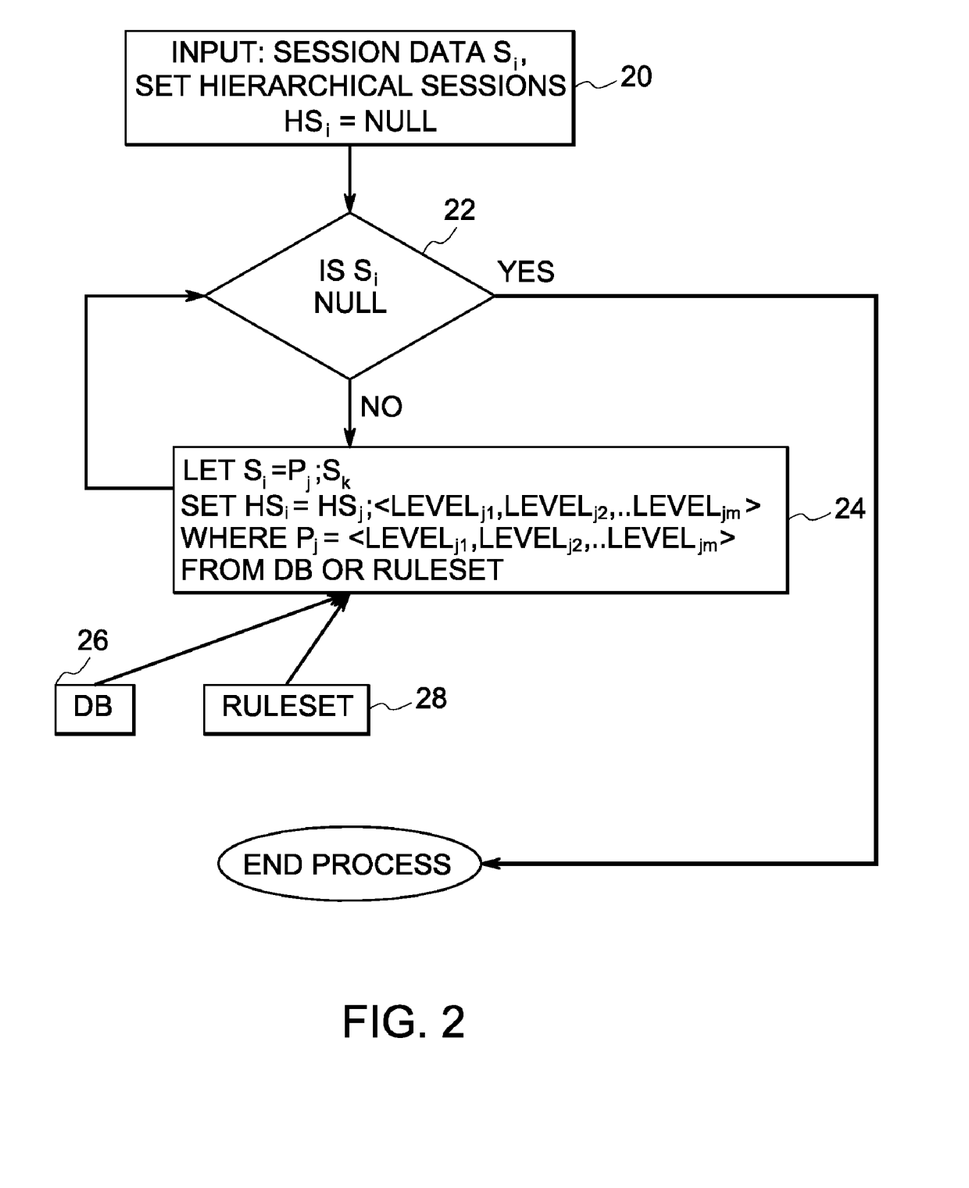
FIG. 2 illustrates a flow chart for generating hierarchical session data from user session data arranged in FIG. 1.

FIG. 2 illustrates a flow chart for mapping user sessions to hierarchical sessions. A hierarchical user session is a session mapped to the hierarchical levels of the website.

$$HS=<level_1, level_2, level_3 \ldots level_j>; <level_1, level_2, level_3 \ldots >$$

In step 20 the user sessions arranged in FIG. 1 are taken as an input. For a user session $S_i$, the hierarchical session $HS_i$ is initialized as null. In step 22 it is determined whether $S_i$ is null or has some pages visited by a user in session $S_i$. When the user session $S_i$ is null, the process is ended, as there are no more website page views by a user. When the user session $S_i$ is not null and has some website page views by a user, the process proceeds to step 24. In step 24 website usage data about the user session $S_i$ is received from the database and rules from the ruleset is applied to map sessions $S_i$ to a hierarchical user session $HS_i$. In order to map user sessions $S_i$ to a hierarchical session $HS_i$, $S_i$ and $HS_i$ are represented as follow:

$$S_i=P_j;S_k$$

$$HS_i=HS_i; <level_{j1}, level_{j2}, level_{j3} \ldots level_{jm}>$$

where $P_j$ is a page, j is a number of a page and $S_k$ is remaining user session of user session $S_i$ after extracting website page $P_j$ and $P_j=<level_{j1}, level_{j2}, level_{j3} \ldots level_{jm}>$ is the mapping of $P_j$ to the hierarchical levels using the ruleset and database. Once $P_j$ is mapped to hierarchical structure of the website, step 22 is repeated to determine the presence of other website page view in the session $S_i$. Thus, step 24 is repeated till $S_i$ is null and there are no more website page views by the user. For example, for a website with two levels of hierarchy including $level_1$ and $level_2$, $level_1$ has categories including Beauty and Health, and $level_2$ has categories including Navigation and Content. Each user session is a sequence of website page views and a website page view may be represented as $<level_1, level_2>$. Thus, when user sessions $S_1, S_2$ and $S_3$ are mapped to the hierarchical structure of the website, the hierarchical user sessions $HS_1$ $HS_2$ and $HS_3$ are represented as follow:

$$HS_1=<Beauty, Navigation>;<Beauty, Content>$$

$$HS_2=<Beauty, Navigation>;<Beauty, Navigation>$$

$$HS_3=<Beauty, Navigation>;<Health, Content>$$

Figure 3:
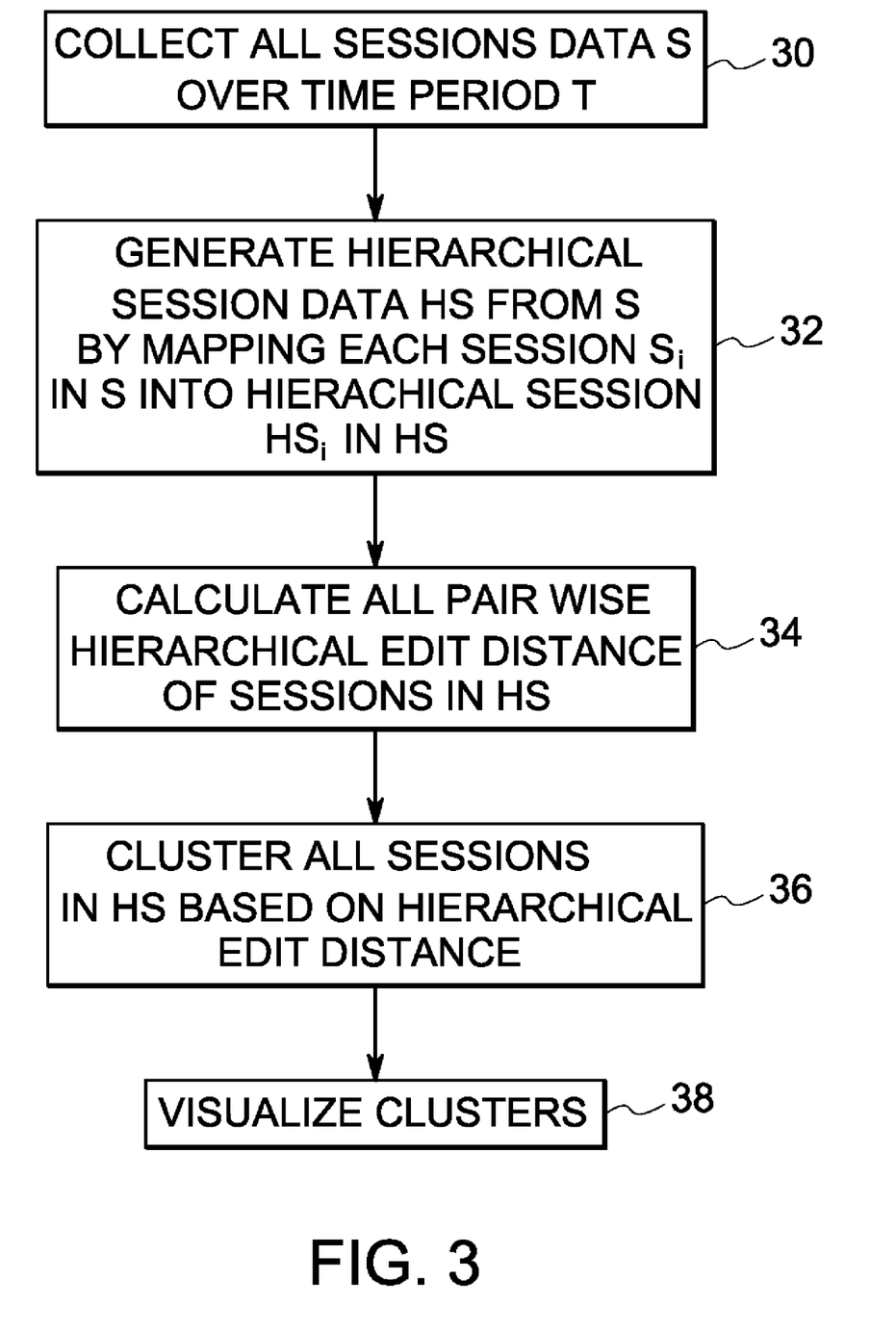
FIG. 3 illustrates a process flow diagram for clustering user sessions.

FIG. 3 illustrates a process flow diagram for clustering hierarchal user sessions on the basis of similarity in hierarchical user sessions. In step 30 all the user sessions for a time period T are collected and arranged as shown in FIG. 1. The time period T is decided as per the business preferences and requirements. In step 32 each user session data is mapped to hierarchical structure of the website to generate hierarchical user session data as illustrated in FIG. 2 description above. Thus, if S comprises sessions $S_1, S_2, S_3, S_4 \ldots S_i$ and HS includes the hierarchical user sessions, then each session $S_1, S_2, S_3, S_4 \ldots S_i$ is mapped to the hierarchical structure of the website to obtain hierarchical user sessions $HS_1, HS_2, HS_3 \ldots HS_i$ respectively. Mapping of user sessions to the hierarchical user sessions is followed by initialization of a metric to determine the similarity in the hierarchical user sessions in step 34. The similarity can be determined between all the pairs of the hierarchical user sessions. The similarity in the hierarchical user sessions is determined such that similarity in the context of usage of the hierarchical user sessions may be similar. For example, even if two user sessions start differently by viewing different website pages, the two user sessions may be similar. A user may directly go to specific part of the website or may navigate to that specific part of website, thus, determination of similarity in hierarchical user sessions is done irrespective of the hierarchical user sessions lengths. The similar hierarchical user sessions are then clustered in groups.

In an embodiment of the invention, determination of similarity in hierarchical user sessions may include determination of edit distance. Edit distance can be defined as minimum number of operations needed to transform a sequence of website page views (string of page views) of a hierarchical user session to a string of website page views of another hierarchical user session. The operations required to transform one string of website page views to another string website page views can include insertion, deletion, swapping, replacement or substitution of one or more page views in a user session. Each operation performed has a cost that is determined to evaluate the similarity in the user sessions. The cost involved depends upon the type of operation performed and number of operations performed. Two hierarchical user sessions having cost less than predefined cost limits are similar else are different. The predefined cost limit depends on business preferences and requirements.

Edit distance between two hierarchical user sessions is proportional to the cost of transforming string of website page views in a user session to a string of website page views in another user session. Thus, greater is the distance between two hierarchical user sessions more is the cost of transformation of one hierarchical user session to another hierarchical user session and the lesser is similarity between the two user sessions. In an aspect of the invention determination of edit distance also includes normalization of user session and hierarchical user session lengths in determination of edit distance.

It should be understood that there are a number of alternative metrics besides edit distance that may be utilized with the system detailed herein to determine a measure of similarity between user sessions. For example, Euclidean distance, Hamming distance, Jaro distance, Levenshtein distance, Dice's coefficients and cosine similarity are methods that can be used to define the distance between the user sessions.

In one embodiment, similarity between hierarchical user sessions can be calculated using various techniques including Levenshtein Distance, Damerau-Levenshtein and Jaro and Jaro-Winkler by modifying the techniques such that they are applicable on hierarchical structure of the website. In another embodiment, the edit distance can be calculated by McBrideQuimbyShih distance technique with modifications to implement McBrideQuimbyShih on the hierarchical structure of a website. In McBrideQuimbyShih technique, no bias is present between longer strings and smaller strings of characters and only the number of edits required to convert one string of characters to another string of characters is taken to count for calculating the cost of editing one string of characters to another. For example, when a string of 99 A's is edited to reach a string of 97 A's, the technique results in a cost of 2, as only two A's are deleted or inserted to convert one string of characters to another. This cost is same as when a string of 5 A's is edited to reach a string of 3 A's. In the McBrideQuimbyShih technique, repeated characters are not taken into account to calculate the cost, and thus a condition is implemented to calculate the edit distance. The condition determines the cost of inserting, deleting and substituting characters in a string to be 1 if the character being inserted, deleted, or substituted is present in both strings of characters.

In a non-limiting example, a website has two granular levels including $level_1$ and $level_2$. $level_1$ has categories including Beauty and Health, and $level_2$ has categories including Navigation and Content and the hierarchical sessions are as follows:

$HS_1$=<Beauty, Navigation>; <Beauty, Content>

$HS_2$=<Beauty, Navigation>; <Beauty, Navigation>

$HS_3$=<Beauty, Navigation>; <Health, Content>

In the above-mentioned hierarchical user sessions there can be three comparisons to determine the distance including dist($HS_1$, $HS_2$), dist($HS_2$, $HS_3$) and dist($HS_1$, $HS_3$). Here, the cost of conversion of hierarchical user session $HS_1$ to $HS_3$ is more than the cost of conversion of hierarchical user session $HS_1$ to $HS_2$. In $HS_1$ and $HS_2$ there is a single difference of $level_2$, i.e. of Content and Navigation, whereas in $HS_1$ and $HS_3$ there is a single difference of $level_1$ i.e. of Beauty and Health that is higher in hierarchy. Thus, $HS_1$ is more similar to $HS_2$ than $HS_1$ is similar to $HS_3$.

In one embodiment for explanatory purposes, each content of a string of hierarchical user session is represented by character of a string, then costs for different operations illustrated above can be determined as follows:

INSERT AND DELETE: Operations including insertion and deletion of a character has the same cost if a character is inserted or deleted in a string. For instance if the cost of inserting character 'a' in a string 'aab' resulting in string 'aaba' is C, then the cost of deleting character 'a' from the string 'aaba' resulting in string 'aab' is also C. However, the cost of insertion or deletion is different when the character added or deleted from a string is the same as the adjoining character. For example dist(ab, a)>dist(aa, a). In dist (ab, a) the character 'b' is deleted to reach character 'a' where character 'b' is not similar to the adjoining character 'a' and thus has a higher cost than dist (aa, a) where character 'a' deleted to reach string 'a' is similar to the adjoining character 'a'. In a non limiting example, there are two costs including $A_1$ and $A_2$ where $A_1$ is the cost of inserting or deleting a character that is not same as the adjoining character and $A_2$ is the cost of inserting or deleting a character that is same as the adjoining character; and $A_1 > A_2$ and there are two hierarchical user sessions $HS_1$ and $HS_2$ as follows:

$HS_1$=<b1, b2>; <c1, c2>

$HS_2$=<c1, c2>

Thus, in order to change hierarchical user session $HS_1$ to $HS_2$ page <b1, b2> has to be deleted from $HS_1$ where the cost for transforming $HS_1$ to $HS_2$ is $A_1$.

REPLACE: In replacement of character, cost is differentiated on the basis of number of level(s) being replaced. For example if there are two levels in a hierarchy including $level_1$ and $level_2$, the cost is determined by determining whether character of $level_1$ is replaced, character of $level_2$ is replaced or both are replaced. In a non limiting example if there are three costs including $R_1$, $R_2$ and $R_3$ such that $R_1 > R_2 > R_3$ and $R_1 < 2*A_1$, then the replacement of a character shall cost as follows:

If all the characters in a string of the hierarchical user session is replaced or in other words all the characters at all the levels of hierarchy are replaced in string of the hierarchical user session then cost is $R_1$;

If character in a string of hierarchical user sessions is replaced by a character at $level_1$ then cost is $R_2$. For instance if in string <n, m> character 'n' is replaced by character 'k' resulting in string <k, m>, then cost of replacement is $R_2$;

If character in a string of user sessions is replaced by a character at $level_2$ then cost is $R_3$. For instance if in string <n, m> character 'm' is replaced by character 'k' resulting in string <n, k>, then cost of replacement is $R_3$;

Replacement may also be equalized to two insertion or deletion operations and thus may cost as per insertion and deletion operation rules.

SWAP: In an example if S is the cost of swapping consecutive symbols then $S < 2*A_1$ and also $S < 2*R_1$. In swap operation, swapping is performed between consecutive characters of a string of hierarchial sessions. Also, swap may be equalized to two insertion/deletion operations or two replacement opeartions illustrated above.

Figure 4:
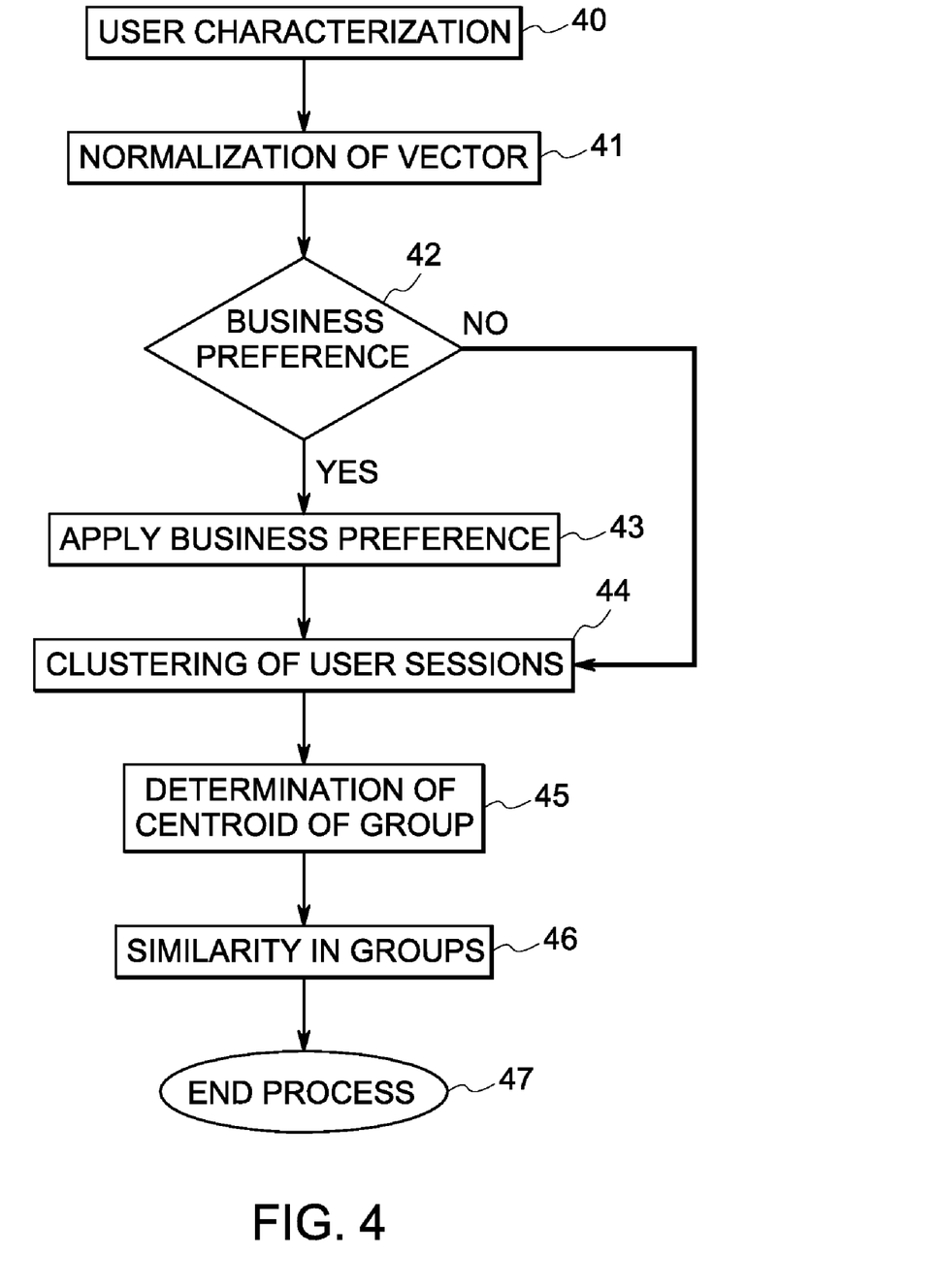
FIG. 4 illustrates another embodiment of the invention for clustering of similar user sessions or users in a group or cluster

FIG. 4 illustrates another embodiment of the invention for clustering of similar user sessions or users in a group or cluster. In the illustrated embodiment, a website N is visited by users and data is collected and arranged as illustrated above. The website N has a hierarchical structure and includes a finite number of levels of hierarchy. In step 40 users are characterized on the basis of the number of website page views made in each level of hierarchy by the users or in users sessions. In an embodiment, each user's sessions is characterized once. In another embodiment all users sessions are characterized irrespective of whether the users sessions are by same user. In still another embodiment only selected users may be characterized depending upon business preferences. For instance if the business preference is related to beauty accessories then only those users are characterized who are interested in beauty accessories. In still another embodiment only those users or users sessions may be characterized who visit pages of business interest. For instance in a website if there are three pages related to handbags and business preference is to understand behavior of the users interested in handbags, then users or user sessions in which the handbag related three pages have been visited are characterized.

In characterization, each user is characterized on the basis of the number of website page views made by the user or number of website page views made in a user session in each level. The characterization is done by forming a vector u that includes the number of pages visited in each level of hierarchy in the website N. In a non limiting example, if on website N there are five levels of hierarchy and a user visits five pages in $level_1$, two pages in $level_2$, no page in $level_3$, eight pages in $level_4$ and 4 pages in level five then user vector u is:

$$\overline{u} = <5,2,0,8,4>$$

In step 41 it is checked if there are some business preferences to be implemented to the vectors. If there is some business preference to be implemented then process is moved to step 42 for implementation of business preference to the vector else the process is moved directly to step 43 by skipping step 42. Business preferences in one embodiment are customizable and are customized as per business interest. For instance in a business preference all the pages of $level_2$ may be twice as important than pages of other levels. Thus, in step 42 business preference is implemented on the vector. Application of the business preference to the above vector results in vector $\overline{u} = <5, 4, 0, 8, 4>$, where $level_2$ number of pages have been multiplied by two to increase its significance by increasing the number of page views in $level_2$. Business preference may be shown as follows:

$$\overline{p} = <w_1, w_2, w_3, w_4, \ldots w_n>$$

where $w_1, w_2 \ldots w_n$ are the extent of preferences given to pages of level number and n is number of levels of hierarchy in the website. In step 43, the vector may be normalized by dividing the website pages viewed in each level by the total number of website page views by a user or in a user session. For example, in vector $\overline{u} = <5, 2, 0, 8, 4>$ total number of page views by the user is $\overline{19}$ and thus, the normalized vector is <5/19, 2/19, 0, 4/19>.

In step 44, the vectors are clustered in accordance to similarity in users or user sessions. In one embodiment, the vectors are clustered by determining similarity in the vectors of users or user sessions using the metrics described in FIGS. 1 to 3. The vectors with less distance or in other words more similarity are included in a cluster. In still another embodiment, clusters of vectors may be formed using one or more of the following methods among others including K-means clustering method, Fuzzy C-means clustering method, Gaussian mixture model, and so on. Each group or cluster thus formed includes users having similar interest in the website. In step 45, the centroid is determined for all the clusters formed in step 44, wherein the centroid is used to represent an interest vector of each cluster or group formed. The distances between centroids of the clusters are determined to find similarity between the groups or clusters or dissimilarity between user groups or clusters. In one embodiment, the distance between all the possible pairs of centriods is calculated. The various techniques including Mahalanobis distance may be used to calculate distance between clusters or groups using the centroids calculated for each group. The clusters formed can then be used to segment new users or new sessions in one of the clusters. When a new user visits a website, similarity is determined between the new user and the existing clusters. In an embodiment of the invention, a similarity metric can be used to determine similarity of the new user or new session to centroids of each existing cluster. The similarity is then normalized by average similarity of the vectors from that cluster to the cluster centroid. This normalized similarity of the new user can then be used to rank the closeness of the new user or new session to the existing clusters. The new user is then assigned to any one of the existing clusters to which the new user is most similar. The segmentation of the users or user sessions (existing or new) in clusters shows the users recent interest or affinity or trends. The clusters also reflect behavior of different categories of users and help in designing the website and can also be used in providing effective recommendations to users having interest similar to a cluster.

Figure 5:
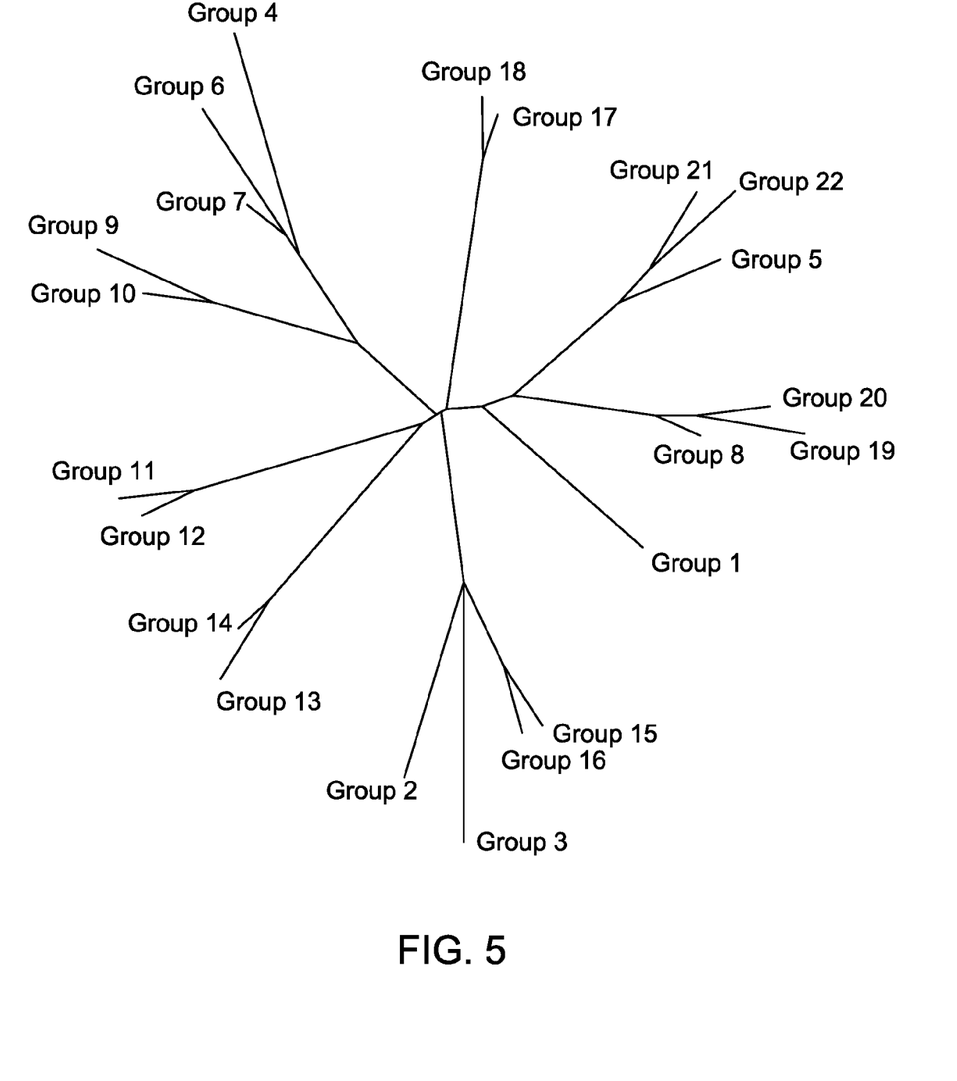
FIG. 5 shows visualization of clusters formed in accordance to one embodiment of the invention

FIG. 5 shows visualization of clusters formed or created in FIGS. 1 to 3 and FIG. 4 in accordance to one embodiment of the invention. In this FIG. 5 similar groups of users are clustered on the basis of similarity in user sessions. Each cluster may contain one or more user or user sessions. The similar users or user sessions are clustered by application of the steps illustrated in FIG. 3 and FIG. 5 on users or users sessions of a website N. The user sessions are collected and arranged as shown in FIG. 1 and are then mapped to hierarchical structure of website N as shown in illustration of FIG. 2 above. The hierarchical users sessions are then clustered to form clusters as illustrated in FIGS. 3 and 4 and are then visualized in different ways. FIG. 5 shows one embodiment of visualization of the clusters by showing different clusters shown on different branches of the picture. For instance groups 17 and 18 are two clusters on one branch and although being different share some similarity and, group 17 and 18 are different from group 4, group 6 and group 7 as they are on a different branch.

In one example, clustering can be accomplished using clustering algorithms that use the pair wise distance between elements to assign various subgroups. Each subgroup may belong to a higher-level group if all the elements of the subgroup are a proper subset of the group. In hierarchical clustering, there are subgroups within subgroups. In non-hierarchical clustering, there are several distinct subgroups, which themselves taken together form a group of the original elements.

Clusters can also be visualized using different pictorial representation as per business need and goal. In accordance to one embodiment of the invention various pictorial representations include Dendrograms, tree diagrams, rectangle plots and self-organizing maps.

The clusters formed have properties including number of users or user sessions, mean value of distances between users and user sessions, minimum and maximum distances between users and user sessions, mean distance between each user and user session and each user and user session outside the group, minimum and maximum distances between each user and user session in the group and each element outside the group. These properties can be used to visualize the clusters to determine anomalies or trends.

To determine trends and anomalies clusters can be made and visualized periodically (the period depending upon business preference) with the most recent website visits and clusters made in the past (from now represented as existing clusters) as inputs. The periodic clustering and visualization can be used to monitor evolution of the key cluster attributes over time and identify trends or anomalies. In an embodiment of the invention for each recent cluster the most nearest existing cluster is identified. Thus, by comparing the recent clusters with the existing set of clusters over a period of time trends can be established. For example, an emergence of new cluster or disappear of an old cluster is an anomaly. In addition, change of membership of existing clusters over time to a new set of clusters is also an indication of certain trend. In an embodiment of the invention many other derived attributes from the clusters can be used for determining trends of an anomaly, for example, mean value of distances between users or user sessions in a cluster, the minimum and maximum distances between users or user sessions in a cluster, the mean distance between each user or user session in a cluster and each user or user session outside the cluster, the minimum and maximum distances between each user or user session in a cluster and each element outside the cluster.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for mining websites, comprising:
obtaining web usage data for users of a website, wherein the website is a hierarchical structure of webpages, and wherein each webpage comprises content categorized into at least two granular levels of the hierarchical structure;
constructing a plurality of hierarchical user session data structures, wherein each hierarchical user session data structure comprises the web usage data from a user session that is organized based on the hierarchical structure of the website;
normalizing each of the hierarchical user session data structures by dividing the number of webpages in each level of the hierarchical structure of webpages viewed during each user session by a total number of webpages in the website viewed during each user session;
comparing metrics of the plurality of normalized hierarchical user session data structures to determine closeness between the plurality of hierarchical user session data structures; and
clustering two or more of the plurality of normalized hierarchical user session data structures into groups based on ranking the determined closeness.

2. The method of claim 1, wherein the web usage data is obtained over a fixed period of time.

3. The method of claim 2, wherein the fixed period of time is customizable based upon a business interest.

4. The method of claim 1, wherein the user session extends from a beginning of activity on the website by a user until the user exits the website.

5. The method of claim 1, wherein the user session is a sequence of page views.

6. The method of claim 1, wherein the user session comprises a path of webpage views, webpage views by a certain user, webpage views by different users, or any combination thereof.

7. The method of claim 1, wherein the metrics determine a cost of conversion of one of the plurality of normalized hierarchical user session data structures to another one of the plurality of hierarchical user session data structures.

8. The method of claim 1, wherein the metrics determine a minimum number of operations performed to transform a web surfing path represented by one of the plurality of normalized hierarchical user session data structures into another web surfing path represented by another one of the plurality of hierarchical user session data structures.

9. The method of claim 1, wherein the metrics determine at least one of a distance between web surfing paths represented by two or more of the plurality of normalized hierarchical user session data structures or a distance between each pair of the plurality of normalized hierarchical user session data structures.

10. The method of claim 9, wherein the distance between web surfing paths represented by two different hierarchical user session data structures is determined using one or more of Levenshtein Distance, Damerau-Levenshtein distance, Jaro-Winkler distance, Jaro and McBrideQuimbyShih distance.

11. The method of claim 1, comprising detecting trends or anomalies in the groups.

12. A method for segmenting website users, comprising:
obtaining web usage data of a plurality of users of a website, wherein the website has a hierarchical structure with a finite number of granular levels;
constructing a plurality of normalized user vectors from the web usage data, wherein each normalized user vector comprises a number of webpages in each level of the hierarchical structure viewed by a particular user of the website divided by the a total number of webpages in the website viewed by the particular user;
clustering two or more of the plurality of normalized user vectors into groups based upon a similar user interest;
determining a centroid for each group, wherein the centroid represents an interest vector of the group;
determining closeness between the groups or between at least one normalized user vector and at least one group; and
ranking the closeness between the groups or between the at least one normalized user vector and the at least one group.

13. The method of claim 12, wherein constructing a plurality of normalized user vectors comprises incorporating business preferences in the plurality of normalized user vectors.

14. The method of claim 12, wherein the hierarchical structure of the website comprises a plurality of content associated with at least two granular levels of the hierarchical structure.

15. The method of claim 12, wherein the granular levels comprise content categories or subcategories of the website.

16. The method of claim 12, wherein the plurality of normalized user vectors comprises the respective number of webpages in each level of the hierarchical structure viewed by each the plurality of users of the website.

17. The method of claim 12, wherein the plurality of normalized user vectors comprises the respective number of webpages in each level of the hierarchical structure viewed by a selected portion of the plurality of users of the website.

18. The method of claim 12, wherein the closeness between groups is determined from the centroid of each group using a Mahalanobis distance method.

19. The method of claim 13, wherein each normalized user vector is altered based upon a business preference.

20. The method of claim 12, wherein the web usage data of the plurality of users of the website are collected for a configurable, predefined period of time.

21. The method of claim 1, comprising presenting a visual depiction of the groups.

22. The method of claim 12, comprising presenting a visual depiction of the groups.

23. The method of claim 12, presenting a visual depiction of the centroids of the groups, the closeness of the groups, or both.

* * * * *